April 19, 1949.  R. R. GOSHORN  2,467,472
GASEOUS TUBE FLASHER CIRCUIT
Filed Feb. 26, 1947
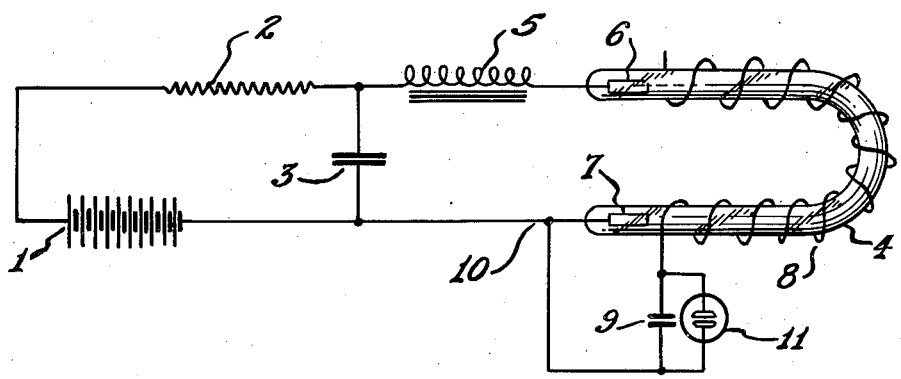
INVENTOR.
ROBERT R. GOSHORN.
BY Allen & Allen
ATTORNEYS.

Patented Apr. 19, 1949

2,467,472

UNITED STATES PATENT OFFICE 2,467,472

GASEOUS TUBE FLASHER CIRCUIT

Robert R. Goshorn, Cincinnati, Ohio, assignor to Automatic Electrical Devices Company, Cincinnati, Ohio, a corporation of Ohio Application February 26, 1947, Serial No. 730,880

5 Claims. (Cl. 315—235)

My invention relates to a gaseous tube flasher circuit wherein the gaseous tube is actuated and energized by a battery preferably of the dry cell variety in successive flashes of very short duration spaced relatively far apart so as to conserve the current of the battery and operate the flasher for a relatively great length of time.

In a copending application filed February 11, 1947 Serial No. 727,789 and entitled Back panel for flasher casing or the like, I have shown a flasher circuit for operating a gaseous tube as above described wherein the tube consists of an electric neon glow lamp with a starting voltage of 85 direct current and having the electrodes spaced very closely together.

While the circuit described in my copending application works very satisfactorily with a neon glow lamp with the electrodes spaced closely together, I have found that such a circuit alone is not adapted to operate a neon-type gaseous tube wherein the electrodes are spaced relatively far apart, as an example, 12 inches apart.

When using a gaseous tube with the electrodes spaced relatively far apart, I have found that the first flash or partial flash charges the glass envelope of the tube with static electricity which opposes a further flash of the tube as long as the static charge remains on the envelope.

It is an object of my invention to provide a gaseous tube flasher circuit primarily for use with gaseous tubes having electrodes spaced relatively far apart wherein there is a tendency to build up static in the envelope of the tube which opposes continuous flashing.

It is a further object of my invention to overcome the above described condition in long gaseous tubes by establishing a secondary circuit which will intermittently withdraw the static charge from the tube envelope and thus permit further and continuous flashing.

These and other objects of my invention, which will be set forth hereinafter or will be apparent to one skilled in the art upon reading these specifications, I accomplish by that certain construction and arrangement of parts, of which I shall now describe an exemplary embodiment. Reference is now made to the drawing which forms a part hereof and in which:

The figure represents a circuit diagram showing my new gaseous tube flasher circuit.

Briefly in the practice of my invention, I provide a source of direct current which charges a condenser through a resistance. The condenser then discharges through an inductance in series with the gaseous tube. The static electricity set up in the glass tube envelope is conducted away by coarsely spaced turns of wire around the tube and through a small capacity condenser to one side of the line energizing the tube. Across the small capacity condenser is placed a small glow lamp which will light up and discharge the condenser when it has been built up to its capacity by the static on the tube envelope.

In the following description I will describe an exemplary embodiment setting forth a complete operative circuit and enumerating the values of the electrical conductive elements contained in the circuit. However, it is to be understood that conductive elements of different values may be used with gaseous tubes of different lengths and different constructions.

Referring to the drawing, I provide a bank of dry cell batteries 1 presenting a D. C. voltage of between 1000 to 1200 volts. The batteries 1 are connected in series with the resistor 2 and the condenser 3. For the circuit described, I provide a resistor 2 having a resistance of between 10 to 20 million ohms. The resistor 2 is preferably a non-inductive resistor, such as plain carbon. The condenser 3 has a capacity of .015 microfarads.

Across the condenser 3 is connected the electrodes of the gaseous tube 4 in series with the inductance 5. The inductance 5 in this circuit is from 3 to 5 henrys. The gaseous tube in this circuit has electrodes 6 and 7 spaced apart 12 inches and is bent in the form of a U to adapt it for insertion in a socket. The gaseous tube 4, which I use in this exemplary circuit, is 15 mm. in diameter and may contain neon gas at a pressure of 10 mm. Of course, if desirable the tube may be charged with a combination of neon and argon plus liquid mercury for colors and may or may not be coated with a phosphorescent or luminescent coating as desired.

The above described circuit will make the gaseous tube 4 give a partial flash or a single flash. This is brought about as described in my copending application Serial No. 727,789 filed February 11, 1947 and in brief consists of the charging of the condenser 3 by the battery 1 and the discharge of the condenser 3 through the tube 4. However, the first flash or partial flash will create static electricity in the glass envelope of the tube 4 which will oppose any further flash.

In order to remove the static electricity built up in the envelope of the tube 4, I provide a secondary circuit comprising a wire winding 8 around the tube 4 on the outside of the glass envelope. The wire winding 8 may be of either fine or coarse wire, and in the embodiment shown I prefer No. 26 or No. 28 wire. The spacing of the convolutions of the wire 8 are preferably about ¼ in. apart so as not to interfere or restrict the output of light from the tube 4. One end of the wire winding 8 is connected through a condenser 9 of very small capacity to one side 10 of the circuit actuating the gaseous tube 4. Across the condenser 9, I place a small neon glow lamp 11 having an extremely small wattage. The condenser 9 has a capacity of .0005 microfarad.

In operation the static built up in the envelope of the tube 4 charges the condenser 9 which, in turn, is discharged through the small glow lamp 11, thus removing the static from the envelope of the tube 4.

From the above it is apparent that at each flash of the tube 4 from the discharge of the condenser 3, static is built up in the envelope which, in turn, charges the small condenser 9 which, when it reaches its capacity, discharges through the glow lamp 11, thus clearing static from the envelope before the next discharge of the condenser 3 through the gaseous tube 4.

With the above circuits it is possible to flash intermittently a gaseous tube having electrodes spaced relatively far apart by means of a bank of dry cells and thus permit continuous action for a great length of time due to the small current flowing from the dry cells at each flash. The capacity of the condenser 3 and the resistance of the resistor 2 determine the spacing of the intermittent flashes, while the impedance of the circuit determines the duration of the flashes.

From the above it is apparent that similar circuits may be provided for gaseous tubes of different lengths and different designs.

While I have described a wire winding 8, it is within the contemplation of my invention to provide a conductive coating on the outside of the tube envelope 4 which will not greatly restrict the output of light from the tube 4. This may consist of any metallic coating either spirally painted around the tube envelope or placed on the tube envelope in any manner which does not restrict the light but which picks up the static on the envelope.

It is to be understood that modification may be made in my invention without departing from the spirit thereof, and I do not intend to limit myself otherwise than as pointed out in the claims which follow. Having thus described my invention what I claim as new and desire to secure by Letters Patent is:

1. A battery operated flasher circuit for gaseous tubes of an appreciable length which comprises a bank of batteries in series with a resistor and a condenser, the electrodes of a gaseous tube being in series with an inductance and said condenser, a separate circuit comprising a wire with coarsely spaced turns surrounding the gaseous tube envelope and connected to the circuit including the tube electrodes through a condenser of low capacity across which is connected a small gaseous glow lamp to discharge the same.

2. A battery operated flasher circuit for gaseous tubes of an appreciable length which comprises a bank of batteries in series with a resistor and a condenser, the electrodes of a gaseous tube in series with an inductance connected across said condenser, a separate circuit comprising conductive material associated with the outside of the gaseous tube envelope and connected to the circuit including the tube electrodes through a condenser of low capacity across which is connected a small gaseous glow lamp to discharge the same.

3. A circuit for intermittently removing the static charge from the envelope of a gaseous tube of appreciable length which comprises a coarsely spaced conductive winding around said envelope and connected through a low capacity condenser to one side of the tube energizing circuit and a small gaseous glow lamp across said condenser to discharge the same.

4. A circuit for intermittently removing the static charge from the envelope of a gaseous tube of appreciable length which comprises at least a partial coating on the tube envelope of conductive material and a connection between the same and one side of the tube energizing circuit through a low capacity condenser across which is connected a small gaseous glow lamp to discharge the same.

5. A circuit for intermittently removing the static charge from the envelope of a gaseous tube of appreciable length, which comprises at least a partial coating of conductive material surrounding the tube envelope and a connection between the same and one side of the tube energizing circuit through a low capacity condenser across which is connected means to discharge the same.

ROBERT R. GOSHORN.

REFERENCES CITED

The following references are of record in the file of this patent:

UNITED STATES PATENTS

| Number | Name | Date |
|---|---|---|
| 2,201,003 | Berkey | May 14, 1940 |
| 2,252,638 | McCauley | Aug. 12, 1941 |